(12) United States Patent
Hermanson

(10) Patent No.: US 9,836,492 B1
(45) Date of Patent: Dec. 5, 2017

(54) VARIABLE SIZED PARTITIONING FOR DISTRIBUTED HASH TABLES

(71) Applicant: Amazon Technologies, Inc., Seattle, WA (US)

(72) Inventor: Daniel J. Hermanson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 832 days.

(21) Appl. No.: 13/666,549

(22) Filed: Nov. 1, 2012

(51) Int. Cl.
*G06F 17/30* (2006.01)
*G06F 3/06* (2006.01)

(52) U.S. Cl.
CPC ........ *G06F 17/3033* (2013.01); *G06F 3/0644* (2013.01); *G06F 17/30584* (2013.01)

(58) Field of Classification Search
CPC .............. G06F 17/3033; G06F 17/339; G06F 17/30584; G06F 3/0644
See application file for complete search history.

(56) References Cited

U.S. PATENT DOCUMENTS

| | | | |
|---|---|---|---|
| 6,449,705 B1 * | 9/2002 | Peloquin | G06F 3/061 711/153 |
| 7,788,233 B1 * | 8/2010 | Iyer et al. | 707/661 |
| 8,261,281 B2 * | 9/2012 | Kashyap | G06F 9/5077 709/226 |
| 8,719,307 B2 * | 5/2014 | Surtani | G06F 17/30949 707/693 |
| 9,355,146 B2 * | 5/2016 | Arndt | G06F 17/30466 |
| 2006/0112222 A1 * | 5/2006 | Barrall | G06F 3/0607 711/114 |
| 2008/0243961 A1 * | 10/2008 | Greer | G06F 12/0607 |
| 2012/0011144 A1 * | 1/2012 | Transier | G06F 17/3033 707/769 |
| 2012/0036163 A1 * | 2/2012 | Myers | G06F 17/30321 707/797 |
| 2012/0254175 A1 * | 10/2012 | Horowitz | G06F 17/30584 707/737 |
| 2013/0103694 A1 * | 4/2013 | Luong et al. | 707/747 |

FOREIGN PATENT DOCUMENTS

EP 2538333 A1 * 12/2012

OTHER PUBLICATIONS

DeCandia, G. "Dynamo: Amazon's Highly Available Key-value Store", SOSP'07, Oct. 14-17, 2007, Stevenson, WA, USA, [online][retrieved on Oct. 30, 2012] retrieved from: http://www.read.seas.harvard.edu/~kohler/class/cs239-w08/decandia07dynamo.pdf , 16 pps.

* cited by examiner

Primary Examiner — Huawen A Peng
(74) Attorney, Agent, or Firm — Lee & Hayes, PLLC

(57) ABSTRACT

A distributed hash table ("DHT") is created with partitions that have different sizes. A hash function allocates data to the partitions in the DHT at approximately equal rates. When the data stored on a partition approaches the storage capacity of the partition, the partition is split by adding a new partition to the DHT that has a size that is different than the sizes of the other partitions in the DHT. A portion of the data stored on the split partition is then reallocated to the new partition. A portion of a keyspace previously assigned to the split partition is also allocated to the new partition. Once the keyspace is reallocated, the hash function can allocate data to the new partition in the DHT.

20 Claims, 9 Drawing Sheets

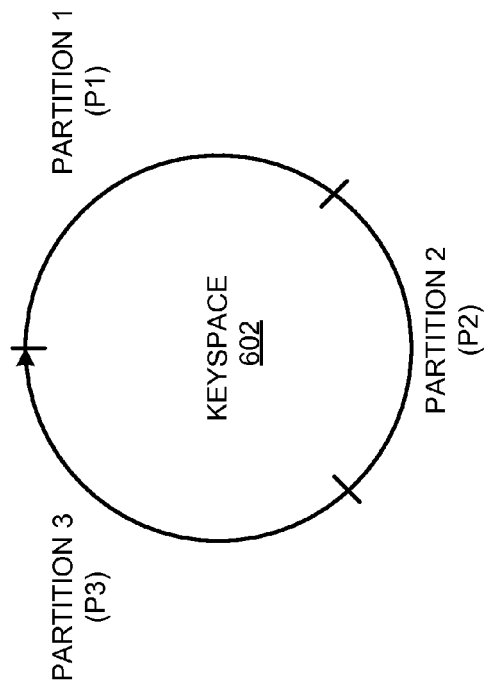
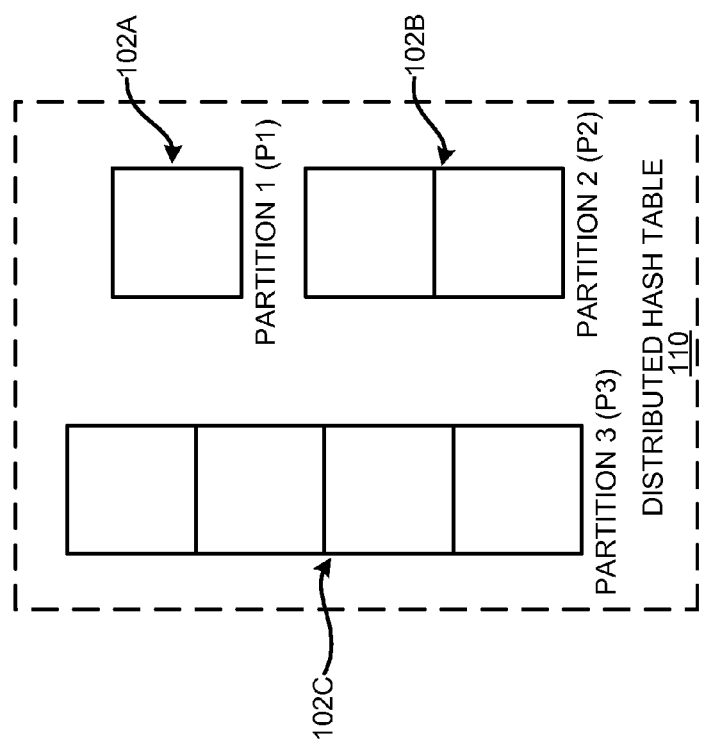

VARIABLE SIZED PARTITIONING FOR DISTRIBUTED HASH TABLES

BACKGROUND

In a distributed hash table ("DHT"), data is organized into a set of distributed partitions that store the data. In order to write data to a DHT, a key attribute is taken from the data, the key attribute is hashed, and the resultant hash value is used to identify a partition at which the data should be stored. In order to retrieve data from a DHT, a client provides a key attribute for the data to be retrieved and the key attribute is hashed. The resultant hash value is then used to identify the partition from which the data is to be retrieved, and the identified partition is queried for the data. The partitions in a DHT can reside on different server computers to increase capacity, on multiple server computers to increase redundancy, or both, so long as a scheme exists for identifying the appropriate partition for storing, retrieving, updating and deleting data.

It is not uncommon for the partitions in a conventional DHT to be equally sized. As a result, it is also not uncommon for each partition in a conventional DHT to approach its maximum storage capacity at approximately the same time. When this occurs, one or more additional partitions must be added to increase the storage capacity, and repartitioning must be performed. For example, if a cluster of server computers storing a conventional DHT is approaching capacity, each server in the cluster is also approaching its storage capacity. To add more capacity by adding a single server to the cluster requires changing every partition maintained by the servers in the cluster. Movement of data in this manner can create a large input/output ("I/O") load on the servers that store the DHT. So large, in fact, that adding additional hosts to a conventional DHT nearing its storage capacity may cause service outages due to the additional repartitioning I/O load.

It is with respect to these and other considerations that the disclosure made herein is presented.

BRIEF DESCRIPTION OF THE DRAWINGS

FIGS. 6A, 6C, and 6E are data diagrams showing aspects of one illustrative DHT that utilizes variable sized partitions, according to one embodiment disclosed herein;

FIGS. 6B, 6D, and 6F are keyspace allocation diagrams showing an illustrative allocation of a keyspace to the partitions shown in FIGS. 6A, 6C, and 6E, respectively, in one embodiment.

DETAILED DESCRIPTION

Figure 1:
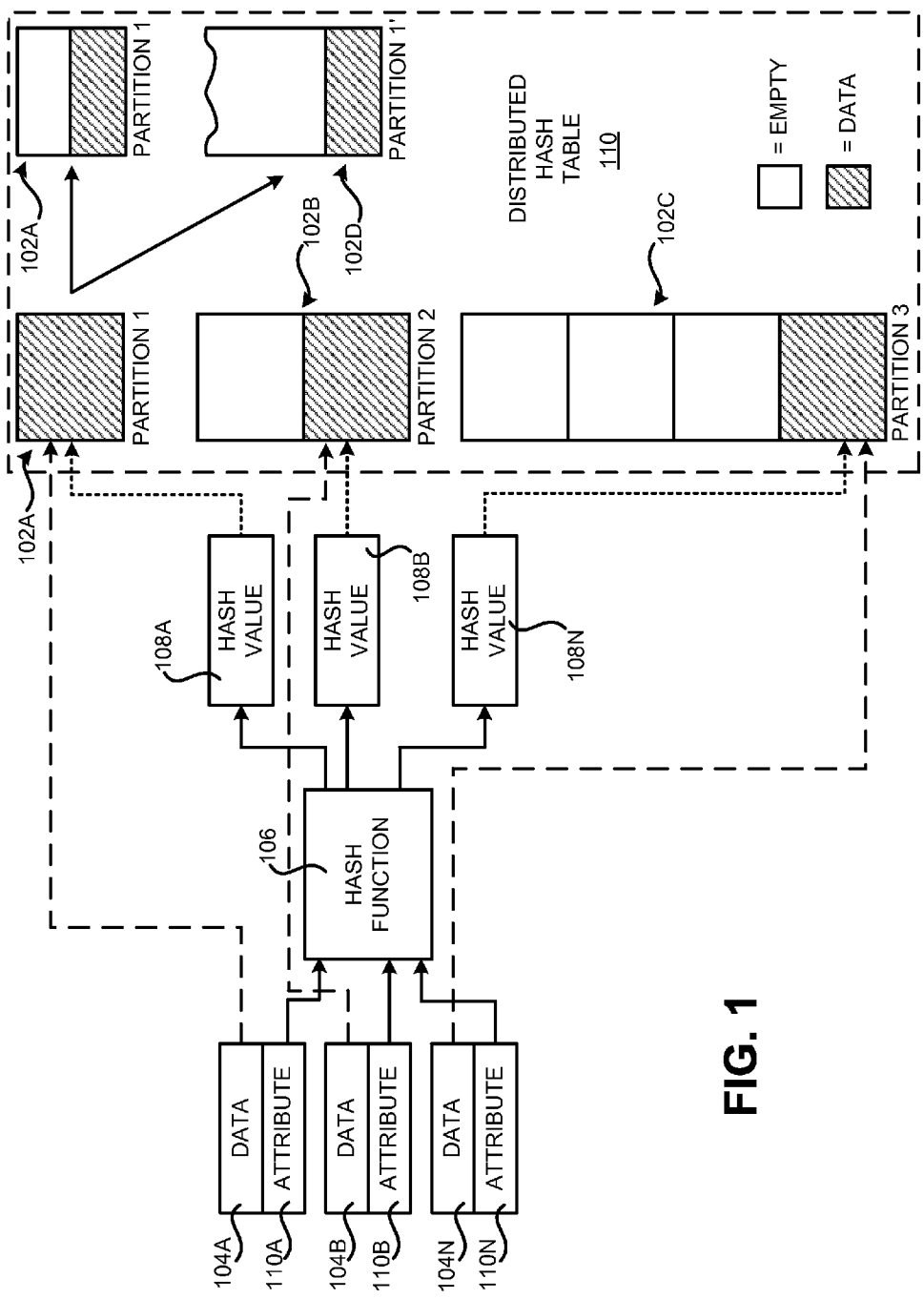
FIG. 1 is a computer system diagram providing an overview description of a mechanism disclosed herein for utilizing variable sized partitions in a DHT, according to one embodiment presented herein.

The following detailed description is directed to technologies for utilizing variable sized partitions in a DHT. Utilizing the technologies described herein, variable sized partitions are utilized in a DHT, rather than the fixed equal sized partitions utilized in conventional DHTs. By utilizing variable sized partitions, the repartitioning I/O load can be reduced. Consequently, the risk of system failure due to increased load during repartitioning might also be reduced. Additional details regarding these and other aspects of the concepts and technologies disclosed herein for utilizing variable sized partitions in a DHT will be provided below.

According to one aspect presented herein, a computer-implemented mechanism provides a DHT that utilizes variable sized partitions. As described briefly above, data in a DHT is organized into a set of distributed partitions that store the data. In order to write data to a DHT, a key attribute is taken from the data, the key attribute is hashed, and the resultant hash value is used to identify a partition at which the data should be stored. In order to retrieve data from a DHT, a client provides a key attribute for the data to be retrieved and the key attribute is hashed. The resultant hash value is then used to identify the partition from which the data is to be retrieved, and the identified partition is queried for the data. The partitions in a DHT can reside on different server computers to increase capacity, on multiple server computers to increase redundancy, or both, so long as a scheme exists for identifying the appropriate partition for storing, retrieving, updating and deleting data.

In order to provide a DHT that uses variable sized partitions, a set of initial partitions are created that have different sizes (i.e. storage capacities). The sizes might be specified manually. Alternately, the sizes of the partitions might be specified in an automated fashion using a mathematical function in some embodiments. For instance, an exponential function might be utilized to determine the sizes of the partitions. Other types of mathematical functions might also be utilized to specify the sizes of the partitions in a DHT.

Once the set of initial partitions has been created, a hash function may be utilized to allocate data to the partitions. Through the use of the hash function, a portion of a keyspace is allocated to each of the partitions in the DHT. In one implementation, approximately equal portions of the keyspace are allocated to each of the partitions in the DHT. Additionally, the hash function is configured to allocate data to each of the partitions in the DHT at approximately equal rates in some embodiments.

After a period of time has elapsed, one or more partitions might approach their storage capacity. As a result, it might be necessary to add more space to the DHT. In order to accomplish this, a new partition may be added to the DHT. Additionally, data from the partition being split might be moved to the new partition. Additionally, responsibility for a portion of the keyspace served by the DHT will be allocated to the new partition. Additional details regarding these processes are provided below.

In one embodiment, a component periodically determines whether any of the partitions in the DHT are to be split. As mentioned briefly above, this might occur, for instance, if a partition approaches its storage capacity or another threshold at which the partition is to be split. This might also occur, for instance, in response to a manual request to split a partition, such as a request from an administrator. When a mathematical function is utilized to specify the sizes of the partitions, it is possible to know in advance which partition will next approach its storage capacity. An administrator might utilize this information to manually request a split of such a partition prior to the time the partition approaches its storage capacity.

If a partition in the DHT is to be split, such as a partition approaching its storage capacity, a new partition is added to the DHT. The size of the new partition is different than the sizes of the other partitions in the DHT. The size of the new partition might be specified manually or by a mathematical function, such as an exponential function described above. Other mechanisms might also be utilized to specify the size of the new partition.

Once the new partition has been created, a portion of the data stored on the partition being split is reallocated to the new partition. For example, one-half or another percentage of the data on the split partition might be moved to the new partition. Because data is allocated to the partitions at approximately equal rates and the sizes of the partitions are different, only one partition typically reaches its capacity at a time. Because data is reallocated from only one partition at a time, the repartitioning I/O load may be reduced as compared to conventional DHTs.

Responsibility for a portion of the keyspace previously assigned to the split partition is also assigned to the new partition. For example, in one embodiment, one-half of the keyspace assigned to the split partition is reassigned to the new partition. Once the keyspace has been reassigned, the hash function can allocate data to the new partition in the DHT. Additional details regarding the various components and processes described above for utilizing variable sized partitions in a DHT will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a computer system diagram providing an overview description of a mechanism disclosed herein for utilizing variable sized partitions in a DHT, according to one embodiment presented herein. As shown in FIG. 1, a mechanism is disclosed herein for providing a DHT 110 that includes partitions 102A-102D (which may be referred to herein singularly "as a partition 102" or collectively as "the partitions 102"). It should be appreciated that although the example DHT 110 shown in FIG. 1 includes four partitions 102, the technologies presented herein might be utilized with DHTs 110 having many more partitions 102 than shown. As will also be described in greater detail below, the partitions 102 in the DHT 110 can reside on different server computers to increase capacity, on multiple server computers to increase redundancy, or both, so long as a scheme exists for identifying the appropriate partition 102 for storing, retrieving, updating and deleting data.

As also shown in FIG. 1, the partitions 102 are created such that each of the partitions 102 has a different size than the other partitions 102. For example, in the DHT 110 shown in FIG. 1, the partition 102A has a size of one unit, which might be megabytes, gigabytes, terabytes, or another unit of data storage. The partition 102B has a size of two units, and the partition 102C has a size of four units. Other sizes might also be chosen for the partitions 102 in the DHT 110, so long as the sizes are different. As will be described in greater detail below, the sizes of the partitions 102 in the DHT 110 might be selected manually or utilizing a mathematical function, such as an exponential function.

In order to store data on the partitions 102 of the DHT, an attribute 110 is taken from the data 104 to be stored, the attribute 110 is hashed, and the resultant hash value 108 is used to identify a partition 102 at which the data should be stored. For instance, in the example shown in FIG. 1A, the attribute 110A of the data 104A is hashed by the hash function 106 to generate the hash value 108A, which identifies the partition 102A as the appropriate location for storing the data 104A. Similarly, the attribute 110B of the data 104B is hashed by the hash function 106 to generate the hash value 108B, which identifies the partition 102B as the appropriate location for storing the data 104B. Likewise, the attribute 110N of the data 104N is hashed by the hash function 106 to generate the hash value 108N, which identifies the partition 102C as the appropriate location for storing the data 104N. Other attributes of other data might be hashed and stored in a similar manner.

In order to retrieve data from the DHT 110, a client provides an attribute 110 for the data 104 to be retrieved and the hash function 106 is utilized to hash the attribute 110. The resultant hash value 108 is then used to identify the partition 102 from which the requested data 104 is to be retrieved. The identified partition 102 is queried for the requested data 104 and the data 104 is returned to the client.

Through the use of an appropriate hash function 106, a portion of a keyspace is allocated to each of the partitions 102 in the DHT 110. In one implementation, approximately equal portions of the keyspace are allocated to each of the partitions 102 in the DHT 110. Additionally, the hash function 106 is configured to allocate data to each of the partitions 102 in the DHT 110 at approximately equal rates in some embodiments. Additional details regarding these aspects will be provided below.

According to embodiments, a software or hardware component is provided that periodically determines whether any of the partitions 102 in the DHT 110 are to be split. This might occur, for instance, if a partition 102 approaches its storage capacity or another threshold at which the partition 102 is to be split. For example, an administrator might specify that a partition 102 is to be split when it reaches 85% of its storage capacity. Other types of threshold values might also be specified indicating when a partition 102 is to be split.

In other embodiments, a partition 102 in the DHT 110 may be split when computing resources associated with the DHT 110 other than storage capacity are nearing their capacity. For example, a partition 102 might be split if memory, storage input/output bandwidth, network bandwidth, or other computing resources utilized by a server that provides the partition 102 are at or nearing their capacity. A partition 102 might also be split in response to the identification of other conditions or constraints.

A partition 102 might also be split in response to a manual request to split a partition 102, such as a request from an administrator. As mentioned briefly above, when a mathematical function is utilized to specify the sizes of the partitions 102 in the manner described herein, it is possible to identify in advance the partition 102 that will next approach its storage capacity or other threshold. An administrator might utilize this information to manually request a split of such a partition 102 prior to the time the partition 102 approaches its storage capacity. This type of split might be referred to herein as an "anticipatory" split of a partition 102.

If a partition 102 in the DHT 110 is to be split, such as a partition 102 approaching its storage capacity, a new partition is added to the DHT 110. For instance, in the example shown in FIG. 1, the partition 102A is approaching its capacity. As a result, this partition 102A is split by first adding a new partition 102D. The size of the partition 102D is different than the sizes of the other partitions 102A-102C in the DHT 110. The size of the new partition 102D might be specified manually or using a mathematical function as described above. Other mechanisms might also be utilized to specify the size of the new partition.

Once the new partition 102D has been created, a portion of the data stored on the partition 102A being split is reallocated to the new partition 102D. For example, one-half or another percentage of the data on the split partition 102A might be moved to the new partition 102D. Because data is allocated to the partitions 102 at approximately equal rates and the sizes of the partitions 102 are different, only one partition 102 typically reaches its capacity, or threshold percentage of its capacity, at a time. Because data is reallocated from only one partition 102 at a time, the repartitioning I/O load will be reduced as compared to conventional DHTs.

Responsibility for a portion of the keyspace previously assigned to the split partition 102A is also assigned to the new partition 102D. For example, in one embodiment, one-half of the keyspace assigned to the split partition 102A is reassigned to the new partition 102D. Once the keyspace has been reassigned, the hash function 106 can allocate data to the new partition 102D in the DHT 110. Additional details regarding the various components and processes described above for utilizing variable sized partitions 102 in a DHT 110 will be presented below with regard to FIGS. 2-7.

Figure 2:
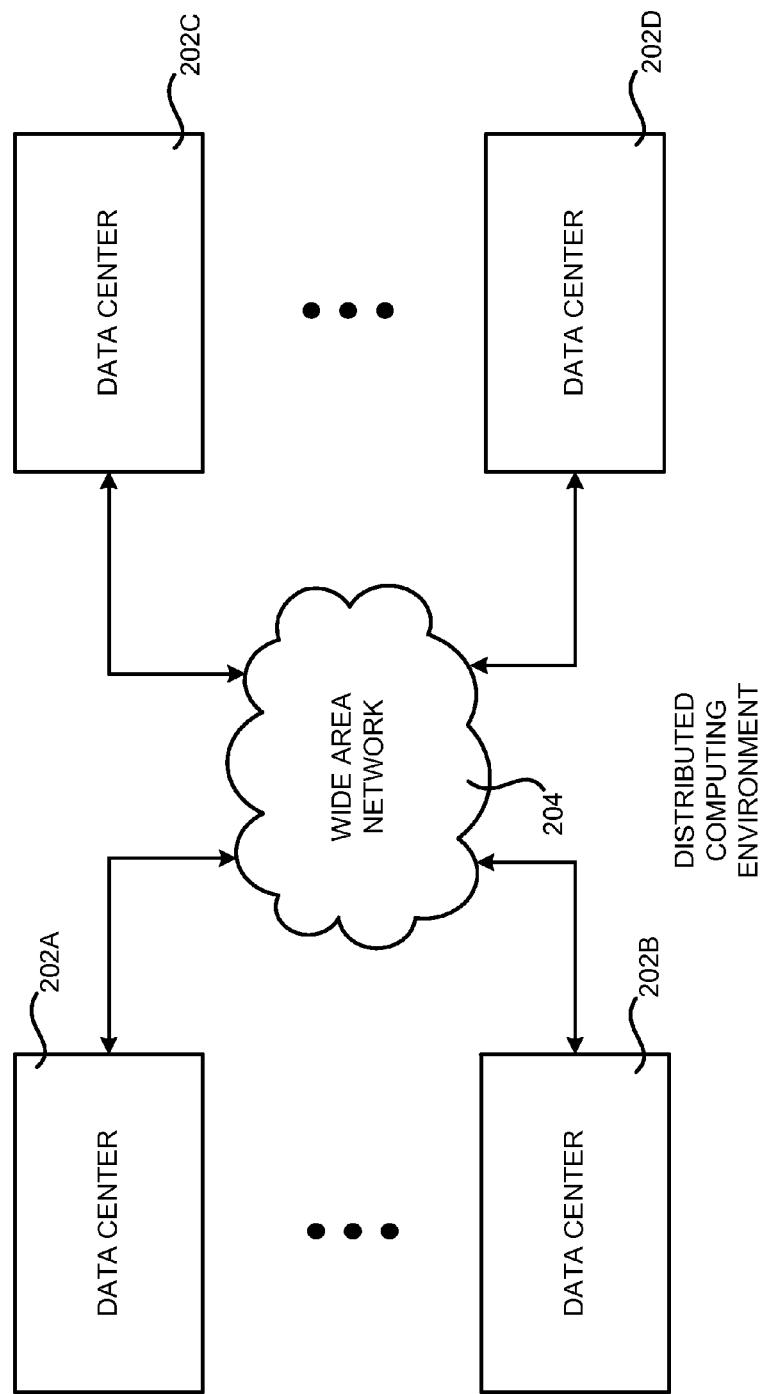
FIG. 2 is network diagram showing aspects of a distributed computing environment in which the embodiments presented herein might be implemented.

FIG. 2 is a network diagram showing aspects of a distributed computing environment that might be utilized to provide an operating environment for the various components described herein for utilizing variable sized partitions 102 in a DHT 110. FIG. 2 and the following description are intended to provide a brief, general description of a suitable computing environment in which the embodiments described herein may be implemented. The distributed computing environment shown in FIG. 2 is configured using a service-oriented architecture one implementation. Other configurations might also be utilized.

The distributed computing environment shown in FIG. 2 can provide computing resources for executing distributed programs on a permanent or an as-needed basis. These computing resources can be utilized to implement a DHT 110. The computing resources provided by the distributed computing environment may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute programs, including Web servers, application servers, media servers, database servers, and other types of components. Data storage resources may include file storage devices, block storage devices, and the like. Each type or configuration of computing resource may be available in different sizes, such as large resources, consisting of many processors, large amounts of memory, and/or large storage capacity, and small resources consisting of fewer processors, smaller amounts of memory, and/or smaller storage capacity.

The computing resources provided by the distributed computing environment are furnished in one embodiment by server computers and other components operating in one or more data centers 202A-202D (which may be referred to herein singularly "as a data center 202" or collectively as "the data centers 202"). The data centers 202 are facilities utilized to house and operate computer systems and associated components for providing a distributed computing environment. The data centers 202 typically include redundant and backup power, communications, cooling, and security systems. The data centers 202 might also be located in geographically disparate locations. One illustrative configuration for a data center 202 that implements aspects of the concepts and technologies disclosed herein for utilizing variable sized partitions in a DHT will be described below with regard to FIG. 3.

Users of the distributed computing environment illustrated in FIG. 2 may access the computing resources provided by the data centers 202 over a wide-area network ("WAN") 204. Although a WAN 204 is illustrated in FIG. 2, it should be appreciated that a local-area network ("LAN"), the Internet, or any other networking topology known in the art that connects the data centers 202 to remote customers and other users may be utilized. It should also be appreciated that combinations of such networks might also be utilized.

The distributed computing environment might provide various interfaces through which aspects of its operation may be configured. For instance, various application programming interfaces ("API") may be exposed by components operating in the distributed computing environment for configuring various aspects of its operation. Other mechanisms for configuring the operation of components in the distributed computing environment might also be utilized.

According to embodiments disclosed herein, the capacity of resources provided by the distributed computing environment can be scaled in response to demand. In this regard, scaling refers to the process of instantiating (which may also be referred to herein as "launching" or "creating") or terminating (which may also be referred to herein as "descaling") instances of computing resources in response to demand. Auto scaling is one mechanism for scaling computing resources in response to increases or lulls in demand for the resources. Additional details regarding the functionality provided by the data centers 202 will be provided below with regard to FIG. 3.

Figure 3:
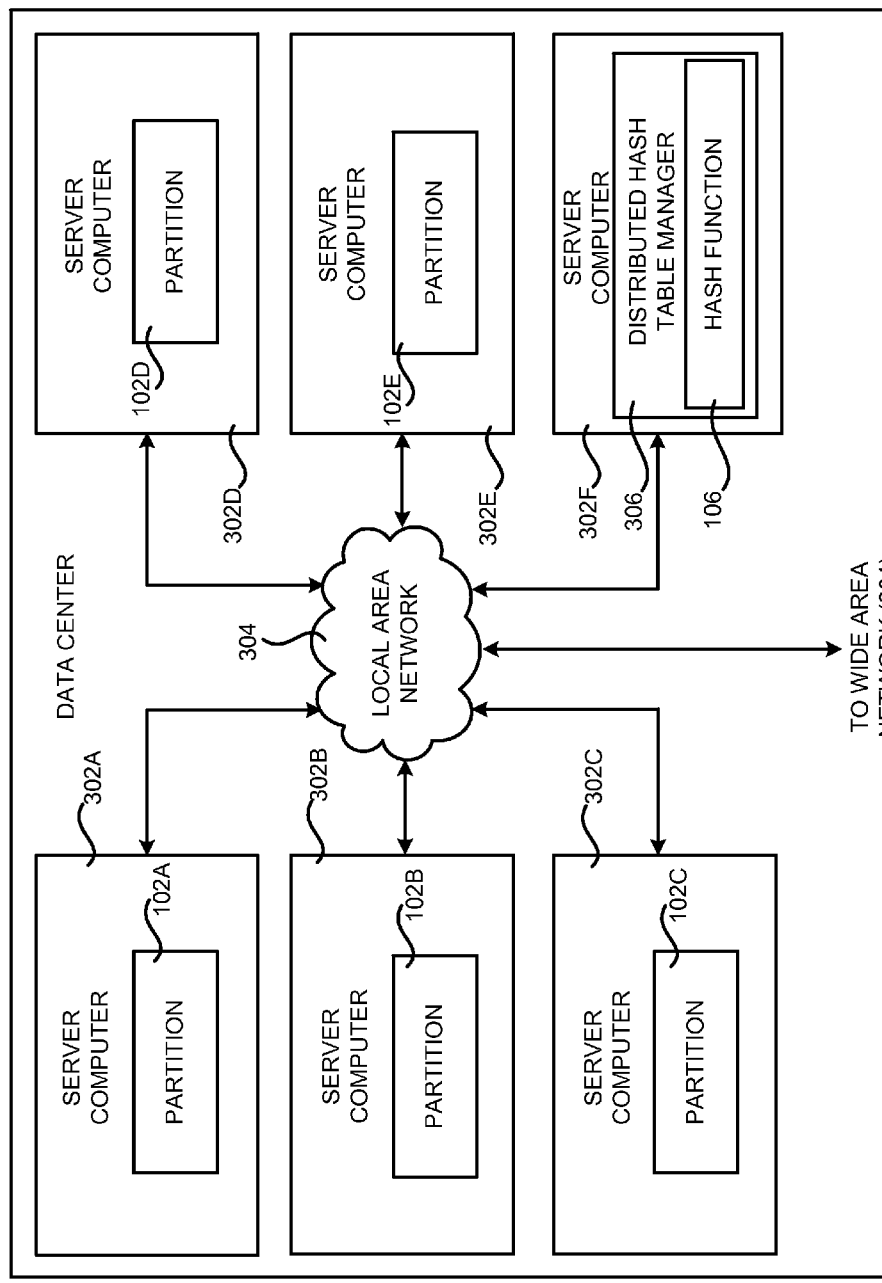
FIG. 3 is a network diagram illustrating aspects of a data center that might be utilized to implement the technologies presented herein for utilizing variable sized partitions in a DHT, according to various embodiments.

FIG. 3 is a computing system diagram that illustrates a configuration for a data center 202A that might be utilized to implement the concepts and technologies disclosed herein for utilizing variable sized partitions 102 in a DHT 110. The example data center 202A shown in FIG. 3 includes several server computers 302A-302F (which may be referred to herein singularly as "a server computer 302" or in the plural as "the server computers 302") for providing computing resources for executing distributed programs. These computing resources might be utilized to implement a DHT 110 and to implement the functionality disclosed herein for managing the growth of partitions 102 within a DHT 110.

The server computers 302 may be standard tower or rack-mount server computers configured appropriately for executing a distributed program or providing other functionality. For example, the server computers 302 might be configured to store partitions 102. In the example shown in FIG. 3, the server computer 302A stores the partition 102A. Similarly, the server computer 302B stores the partition 102B. Likewise, the server computer 302C stores the partition 102C, the server computer 302D stores the partition 102D, and server computer 302E stores the partition 102E. Other partitions 102 might also be stored on other server computers located in other data centers 202. Additionally, each server computer 302 might store more than one partition 102. These server computers 302 might also store and execute software components (not shown) for receiving and responding to requests to store and retrieve data from a partition 102, for creating new partitions 102, and for performing other functions relating to the creation and management of a DHT 110.

The server computers 302 might execute program components directly for managing aspects of the operation of a DHT 110. For instance, the server computers 302 might execute an operating system and execute program components directly on an operating system. Compiled C++ programs, for instance, might be executed in this manner. The server computers 302 might also be configured to execute a virtual machine manager ("VMM") on top of an executing operating system. The VMM might be a hypervisor or another type of program configured to enable and manage the execution of multiple instances on a single server 302, for example. Compiled and other types of programs might be executed in the virtual machine instances for implementing aspects of a DHT 110.

The data center 202A shown in FIG. 3 also includes a server computer 302F reserved for executing software components for managing the operation of the data center 202A and the server computers 302. In particular, the server computer 302F might execute a distributed hash table manager 306 ("DHT manager"). The DHT manager 306 might operate in conjunction with software components executing on the other server computers 302 to implement the functionality disclosed herein for providing a DHT 110 with variable sized partitions 102. For example, the DHT manager 306 might monitor the volume of data stored on the partitions 102 and trigger a split of a partition 102 in response to determining that the partition 102 is approaching a threshold percentage of its capacity. Similarly, the DHT manager 306 might receive requests from an administrator to split a partition 102. The DHT manager 306 might also perform the computations for determining the size of the partitions 102 described herein. The DHT manager 306 might also provide other types of functionality.

In one implementation, the DHT 306 also implements the hash function 106 described above. As mentioned above with regard to FIG. 1, the hash function 106 is utilized to determine which of the partitions 102 at which data should be read or written. The hash function 106 might implement consistent hashing, for instance. Other types of hashing mechanisms might also be utilized.

In the example data center 202A shown in FIG. 3, an appropriate LAN 304 is utilized to interconnect the server computers 302. The LAN 304 is also connected to the WAN 204 illustrated in FIG. 2. It should be appreciated that the network topology illustrated in FIGS. 2 and 3 has also been greatly simplified for discussion purposes and that many more networks and networking devices may be utilized to interconnect the various computing systems disclosed herein. Appropriate load balancing devices or software modules might also be utilized for balancing a load between each of the data centers 202, between each of the server computers 302 in each data center 202, and between virtual machine instances executing within the distributed computing environment. These network topologies and devices should be apparent to those skilled in the art.

It should also be appreciated that the data center 202A described in FIG. 3 is merely illustrative and that other implementations might be utilized. In particular, functionality described herein as being performed by the DHT manager 306 might be performed by other components and/or might be performed by a combination of components. Additionally, it should be appreciated that this functionality might be implemented in software, hardware or a combination of software and hardware. Other implementations should be apparent to those skilled in the art.

It should also be appreciated that the architecture of the server computers 302 shown in FIG. 3 has been simplified for discussion purposes. In this regard, the components illustrated as executing on the server computers 302 are merely illustrative. Many other software and hardware components might also be utilized to perform the functionality disclosed herein for utilizing variable sized partitions in a DHT 110. Additional details regarding the operation of these components will be provided below with regard to FIGS. 4-7.

Figure 4:
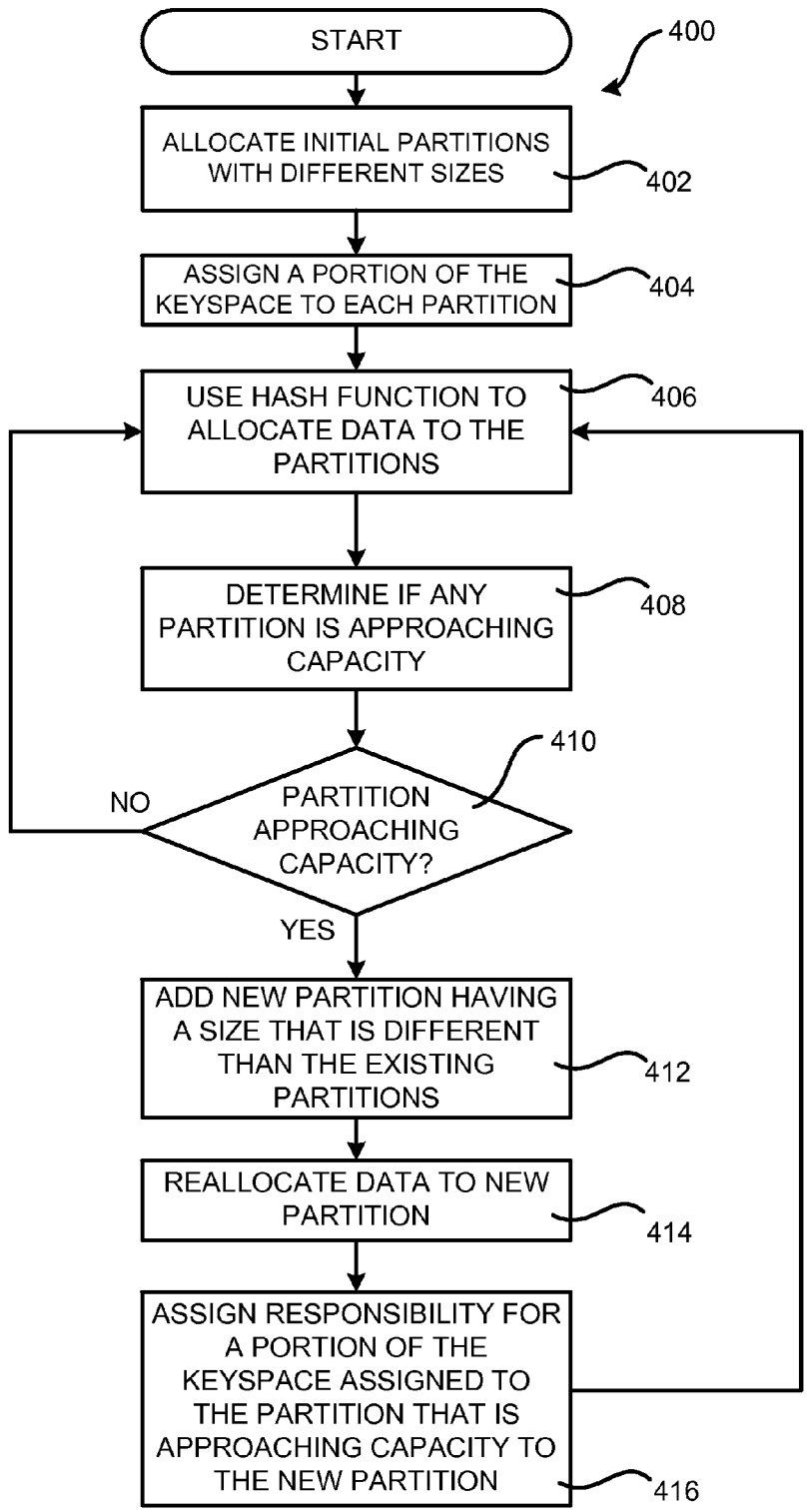
FIG. 4 is a flow diagram showing one illustrative routine for utilizing variable sized partitions in a DHT, according to one embodiment disclosed herein.

FIG. 4 is a flow diagram showing aspects of one illustrative routine 400 for utilizing variable sized partitions 102 in a DHT 110, according to one embodiment disclosed herein. FIG. 4 will be described in conjunction with FIGS. 5, 6A, 6C, and 6E, which are data diagrams showing aspects of one illustrative DHT 110 that utilizes variable sized partitions 102, and FIGS. 6B, 6D, and 6F, which are keyspace allocation diagrams showing an illustrative allocation of a keyspace to the partitions 102 shown in FIGS. 6A, 6C, and 6E, respectively.

It should be appreciated that the logical operations described herein with respect to FIG. 4 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 400 begins at operation 402, where an initial set of partitions 102 is allocated to a DHT 110. For instance, in an example DHT 110 shown in FIG. 6A, an initial set of partitions 102A-102C are added to the DHT 110. As mentioned above, the partitions 102A-102C have different sizes. In the sample DHT 110 shown in FIG. 6A, for example, the partition 102A is one unit in size, the partition 102B is two units in size, and the partition 102C is four units in size. Other sizes might be selected so long as the partitions are different sizes. Additionally, more or fewer partitions 102 might be utilized initially than shown in FIG. 6A.

Figure 5:
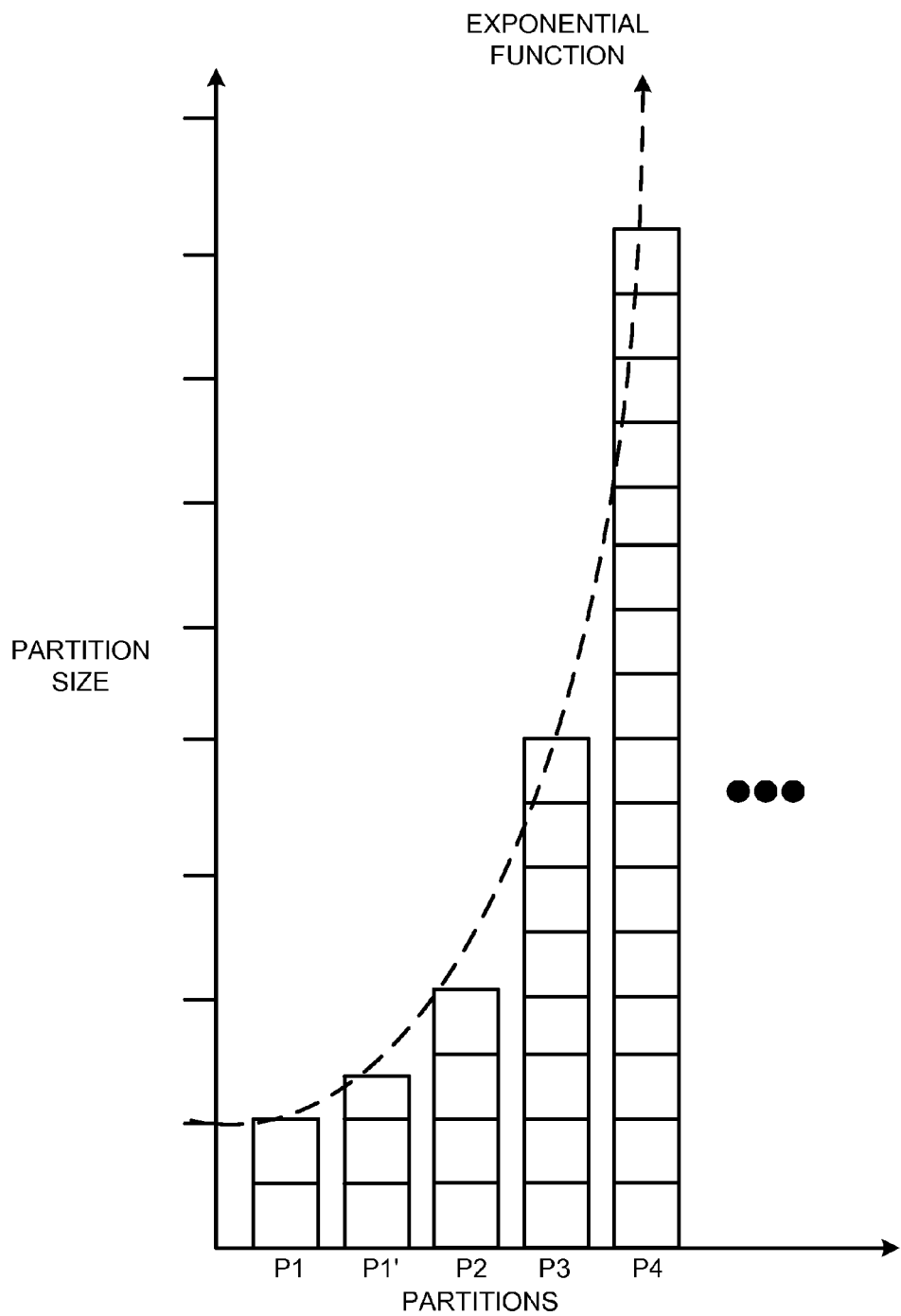
FIG. 5 is a graph diagram showing aspects of a mechanism disclosed herein in one embodiment for exponential growth of the size of partitions in a DHT.

As mentioned above, a mathematical function might be utilized to select the sizes of the partitions 102 in the DHT 110. In the example shown in FIG. 6A, an exponential function has been utilized to select the sizes of the partitions 102A-102C. The exponential function might be expressed as $Y=2^X$, where Y represents the size of a partition, and X represents the number of the partition. This relationship is illustrated in FIG. 5. In the example shown in FIG. 5, four partitions 102 (P1, P2, P3, and P4) are initially in a DHT 110. After the first partition (P1) nears or reaches its capacity, another partition (P1') is added to the DHT 110. This process will be described in greater detail below.

It should be appreciated that while an exponential function has been utilized in the various examples presented herein, other types of mathematical functions might also be utilized to determine the sizes of the partitions 102 in a DHT 110. The sizes might also be specified manually, so long as the sizes of the partitions 102 are different. It should also be appreciated that while the examples presented herein utilize whole numbers (e.g. X=0, 1, 2, 4, 8, etc.), it is not necessary to utilize whole numbers when computing the size of a partition 102 in a DHT 110. It should also be appreciated that it is not necessary for all of the partitions in a DHT 110 to have different sizes. For instance, in some embodiments, two partitions 102 having the same capacity might be assigned to a particular portion of a keyspace for redundancy purposes. Other configurations might also be utilized.

From operation 402, the routine 400 proceeds to operation 404, where a portion of a keyspace 602 is assigned to the partitions 102 in the DHT 110. According to one embodiment, each partition 102 in the DHT 110 is initially assigned an approximately equal portion of the keyspace 602 assigned to the DHT 110. This is illustrated in FIG. 6B. As shown in FIG. 6B, each of the partitions 102A-102C illustrated in FIG. 6A has been assigned approximately one-third of the total keyspace 602. By assigning the keyspace 602 to the partitions 102 in this manner, each of the partitions 102 in the DHT 110 is responsible for an approximately equal portion of the data to be stored in the DHT 110. As a result, the data stored in each of the partitions 102 will grow at an approximately equal rate.

Once the keyspace 602 has been assigned at operation 404, the routine 400 proceeds to operation 406, where the hash function 106 is utilized to store data to and retrieve data from the partitions 102 in the DHT 110. As discussed above, an attribute 110 is taken from the data 104 to be stored, the attribute 110 is hashed, and the resultant hash value 108 is used to identify a partition 102 at which the data should be stored. In order to retrieve data from the DHT 110, a client provides an attribute 110 for the data 104 to be retrieved and the hash function 106 is utilized to hash the attribute 110. The resultant hash value 108 is then used to identify the partition 102 from which the requested data 104 is to be retrieved. The identified partition 102 is queried for the requested data 104 and the data 104 is returned to the client.

From operation 406, the routine 400 proceeds to operation 408, where a component, such as the DHT manager 306, determines whether any partition 102 is to be split. This might occur, for instance, in response to receiving a manual request to split a partition or in response to determining that a partition 102 in the DHT 110 is approaching its capacity or another threshold at which the partition 102 should be split. If no component is to be split, the routine 400 proceeds back to operation 406, where data may continue to be written to, and read from, the partitions 102 of the DHT 110.

If, at operation 410, it is determined that a partition 102 is to be split, the routine 400 proceeds from operation 410 to operation 412. At operation 412, the partition 102 is split by first adding a new partition 102 to the DHT 110. For instance, in the example shown in FIG. 6B, a new partition 102D has been added to the DHT 110 following a determination that the partition 102A is approaching is capacity. A new partition 102 might be added by creating a new partition on an existing server computer 302 or adding a new server computer 302 and creating the new partition 102 on the newly added server computer 302. The new partition may be sized manually or through a mathematical function, such as an exponential function. The new partition 102 may be sized such that its capacity is different than the existing partitions 102 in the DHT 110.

Figure 6D:
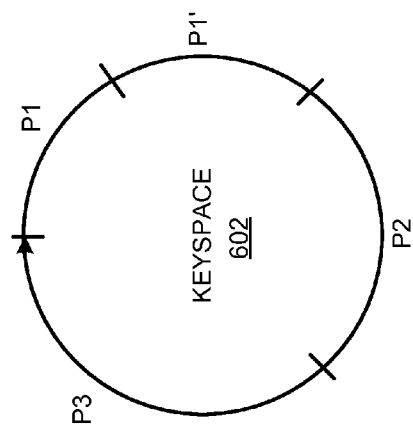
Figure 6C:
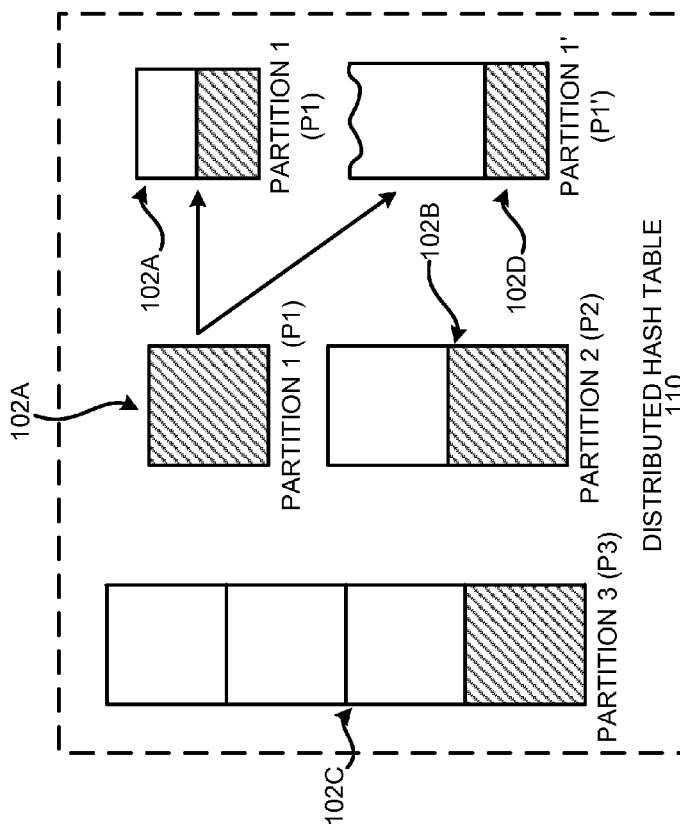

Once the new partition 102D has been added to the DHT 110, the routine 400 proceeds from operation 412 to operation 414. At operation 414, data is reallocated from the split partition 102A to the new partition 102D. For instance, one-half of the data stored on the split partition 102A might be reallocated to the new partition 102D. This is illustrated in FIG. 6C. An unequal amount of data might also be reallocated from the split partition 102A to the new partition 102D in other embodiments.

From operation 412, the routine 400 proceeds to operation 414, where responsibility for a portion of the keyspace 602 previously assigned to the split partition 102A is allocated to the new partition 102D. For instance, as shown in FIG. 6D, approximately one-half of the keyspace 602 previously assigned to the partition 102A approaching its capacity may be assigned to the new partition 102D. Once the keyspace 602 has been reassigned, the routine 400 proceeds from operation 416 back to operation 406, where data may continue to be written to, and read from, the partitions 102 of the DHT 110.

Figure 6F:
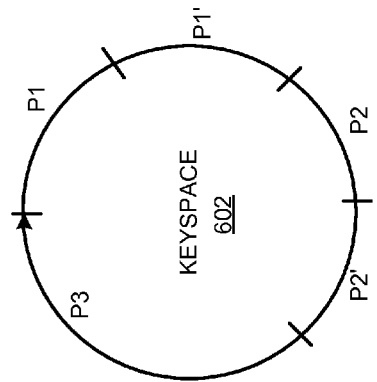
Figure 6E:
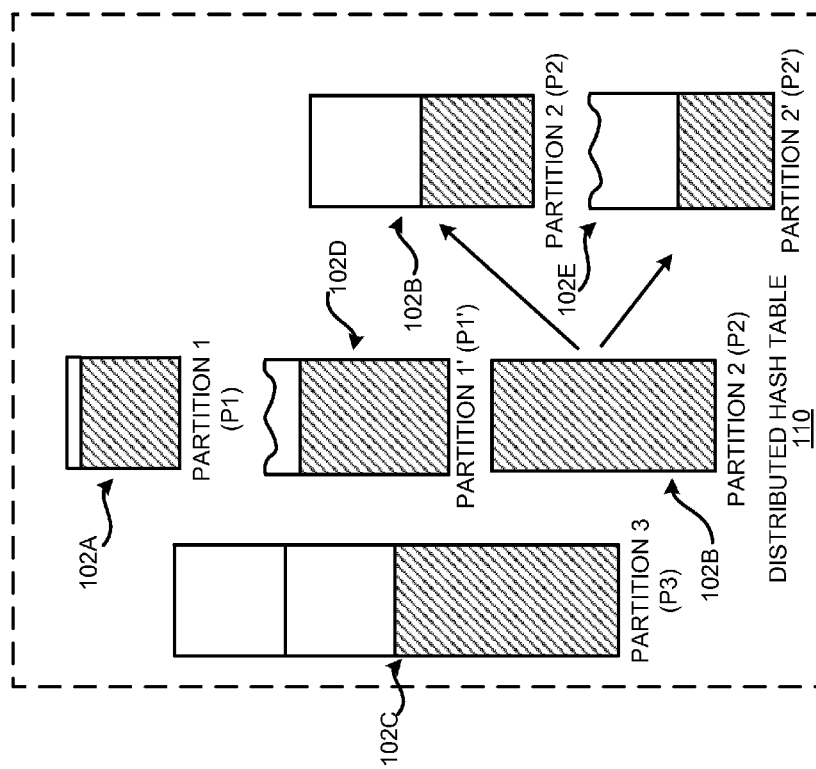

The DHT 110 might also continue to be expanded in the manner described above. For instance, in the example shown in FIG. 6E, the partition 102B is approaching its capacity. In response to the partition 102B approaching its capacity, a new partition 102E is added to the DHT 110. A portion or all of the data stored on the partition 102B is then reallocated to the new partition 102E. Additionally, a portion of the keyspace 602 previously assigned to the partition 102B is allocated to the new partition 102E. In this manner, the partition 102E begins storing data that would have previously been assigned to the partition 102B. This is illustrated in FIG. 6F.

It should be appreciated that the process described above might be repeated indefinitely. In this way, individual partitions 102 are split each time they approach their capacity or another threshold, all or a portion of the data stored on the split partition 102 is reallocated to a new partition 102, and the new partition 102 is assigned responsibility for a portion of the keyspace 602 previously assigned to the split partition 102. By splitting partitions in this manner, the data from only one partition 102 is reallocated at a time, thereby reducing the repartitioning I/O load as compared to conventional DHTs.

Figure 7:
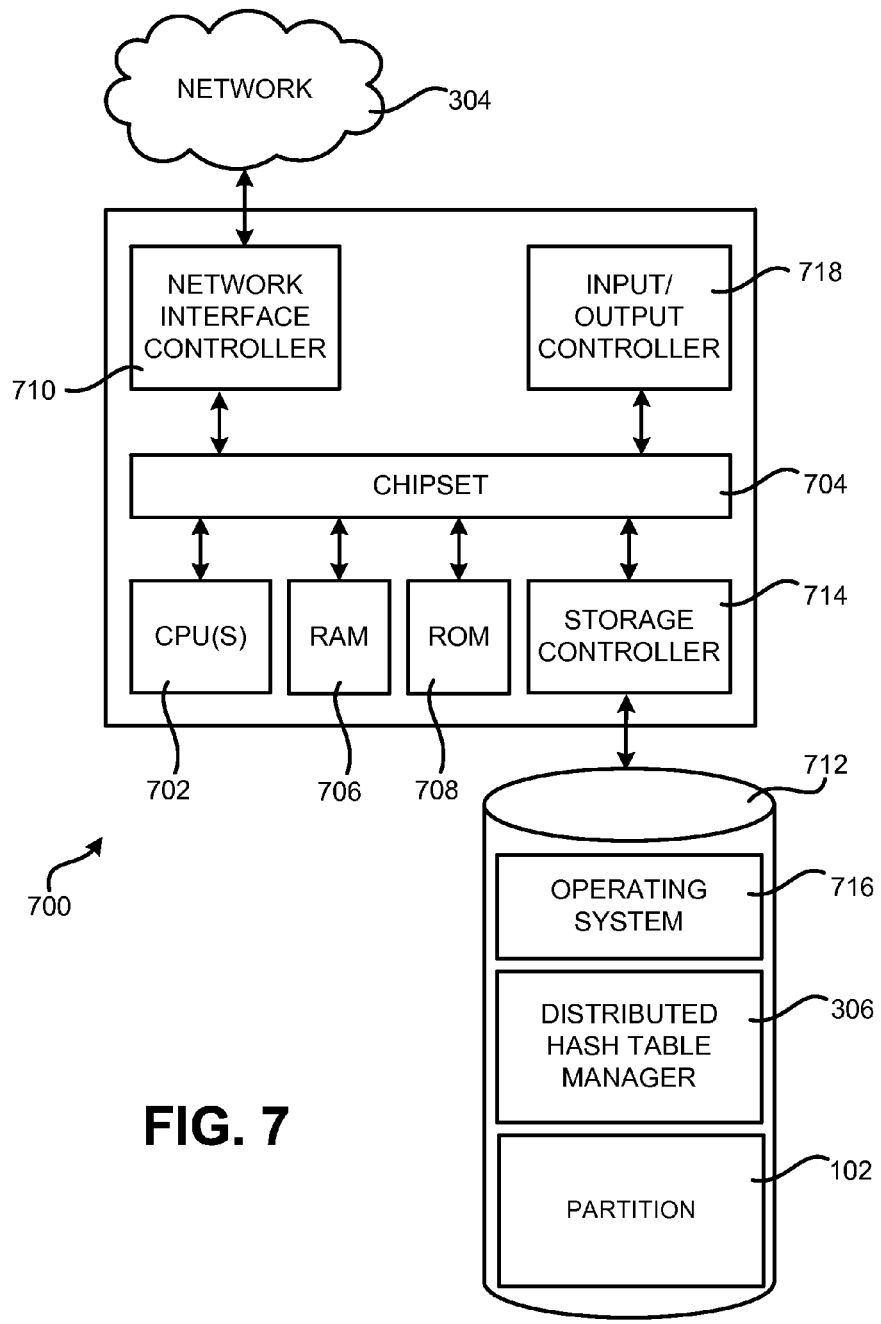
FIG. 7 is a computer architecture diagram showing one illustrative computer hardware architecture for implementing a computing device that might be utilized to implement aspects of the various embodiments presented herein.

FIG. 7 shows an example computer architecture for a computer 700 capable of executing the program components described above for utilizing variable sized partitions 102 in a DHT 110. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein described as executing within the data centers 202A-202N, on the server computers 302A-302N, or on any other computing system mentioned herein.

The computer 700 includes a baseboard, or "motherboard," which is a printed circuit board to which a multitude of components or devices may be connected by way of a system bus or other electrical communication paths. In one illustrative embodiment, one or more central processing units ("CPUs") 702 operate in conjunction with a chipset 704. The CPUs 702 may be standard programmable processors that perform arithmetic and logical operations necessary for the operation of the computer 700.

The CPUs 702 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 704 provides an interface between the CPUs 702 and the remainder of the components and devices on the baseboard. The chipset 704 may provide an interface to a random access memory ("RAM") 706, used as the main memory in the computer 700. The chipset 704 may further provide an interface to a computer-readable storage medium such as a read-only memory ("ROM") 708 or non-volatile RAM ("NVRAM") for storing basic routines that help to startup the computer 700 and to transfer information between the various components and devices. The ROM 708 or NVRAM may also store other software components necessary for the operation of the computer 700 in accordance with the embodiments described herein.

The computer 700 may operate in a networked environment using logical connections to remote computing devices and computer systems through a network, such as the local area network 304. The chipset 704 may include functionality for providing network connectivity through a NIC 710, such as a gigabit Ethernet adapter. The NIC 710 is capable of connecting the computer 700 to other computing devices over the network 304. It should be appreciated that multiple NICs 710 may be present in the computer 700, connecting the computer to other types of networks and remote computer systems.

The computer 700 may be connected to a mass storage device 712 that provides non-volatile storage for the computer. The mass storage device 712 may store system programs, application programs, other program modules, and data, which have been described in greater detail herein. The mass storage device 712 may be connected to the computer 700 through a storage controller 714 connected to the chipset 704. The mass storage device 712 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 712 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 712 is characterized as primary or secondary storage, and the like.

For example, the computer 700 may store information to the mass storage device 712 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 712 by detecting the physical states or characteristics of one or more particular locations within the physical storage units.

In addition to the mass storage device 712 described above, the computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 712 may store an operating system 716 utilized to control the operation of the computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 712 may store other system or application programs and data utilized by the computer 700, such as the partitions 102, the distributed hash table manager 306, the hash function 106, and/or the other software components and data described above. The mass storage device 712 might also store other programs and data not specifically identified herein.

In one embodiment, the mass storage device 712 or other computer-readable storage media is encoded with computer-executable instructions which, when loaded into the computer 700, transforms the computer from a general-purpose computing system into a special-purpose computer capable of implementing the embodiments described herein. These computer-executable instructions transform the computer 700 by specifying how the CPUs 702 transition between states, as described above. According to one embodiment, the computer 700 has access to computer-readable storage media storing computer-executable instructions which, when executed by the computer 700, perform the routine 400, described above with regard to FIG. 4.

The computer 700 may also include an input/output controller 718 for receiving and processing input from a number of input devices, such as a keyboard, a mouse, a touchpad, a touch screen, an electronic stylus, or other type of input device. Similarly, the input/output controller 718 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for utilizing variable sized partitions 102 in a DHT 110 have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for utilizing variable sized partitions in a distributed hash table, the method comprising:
    maintaining a first partition and a second partition in a distributed hash table;
    allocating, using a hash function, data to the first partition and the second partition, a first portion of a keyspace being allocated to the first partition and a second portion of the keyspace being allocated to the second partition, and wherein the data is allocated to the first partition at a first rate and the second partition at a second rate;
    determining that memory associated with the first partition is approaching a first storage capacity;
    determining, for a third partition and based at least in part on an identifier of the third partition, a third storage capacity that is different from the first storage capacity associated with the first partition and a second storage capacity associated with the second partition;
    adding, based at least in part on determining that the first partition is approaching the first storage capacity, the third partition, the new partition having the third storage capacity;
    reallocating, to the third partition, data stored on the first partition; and
    assigning, to the third partition, responsibility for a portion of the keyspace allocated to the first partition.

2. The computer-implemented method of claim 1, wherein the third storage capacity of the third partition is determined utilizing an exponential function.

3. The computer-implemented method of claim 2, wherein the portion of the keyspace allocated to the third partition comprises about one-half of the keyspace allocated to the first partition.

4. The computer-implemented method of claim 1, further comprising splitting, based at least in part on determining that the memory is approaching the first storage capacity, the first partition.

5. The computer-implemented method of claim 1, wherein the data stored on the first partition reallocated to the third partition comprises approximately one-half of the total data allocated to the first partition.

6. A system for providing a distributed hash table that utilizes variable sized partitions, the system comprising:
    one or more computer devices, individual ones of the one or more computer devices storing at least a portion of a distributed hash table comprising one or more partitions, at least some of the partitions having different sizes than other partitions in the distributed hash table; and
    at least one computer device of the one or more computer devices configured to:
        allocate, using a hash function, data at a substantially equal rate to the one or more partitions in the distributed hash table;
        determine that data stored in a partition has reached a threshold;
        split the partition based at least in part on determining that the data stored in the partition has reached the threshold;
        create, based at least in part on splitting the partition, a new partition in the distributed hash table, wherein a size of the new partition is different than sizes of the other partitions in the distributed hash table;
        reallocate substantially one-half of the data stored in the partition to the new partition; and
        assign, to the new partition, a portion of a keyspace assigned to the partition.

7. The system of claim 6, wherein the partition is split based at least in part on an input/output bandwidth nearing a capacity associated with the input/output bandwidth.

8. The system of claim 6, wherein the portion of the keyspace assigned to the new partition comprises substantially one-half of the keyspace allocated to the partition.

9. The system of claim 6, wherein the size of the new partition is based at least in part on a mathematical function.

10. The system of claim 9, wherein the mathematical function comprises an exponential function.

11. A non-transitory computer-readable storage medium having computer-executable instructions stored thereupon which, when executed by a computer, cause the computer to perform operations comprising:
- determining whether to split an existing partition in a distributed hash table comprising a plurality of variable sized partitions;
- determining, based at least in part on an identifier of a new partition, a size of the new partition, the size of the new partition being different than the sizes other partitions in the distributed hash table;
- determining to split the existing partition in the distributed hash table;
- creating, based at least in part on determining to split the existing partition in the distributed hash table, the new partition in the distributed hash table;
- reallocating data from the existing partition to the new partition; and
- allocating a portion of a keyspace assigned to the existing partition to the new partition.

12. The non-transitory computer-readable storage medium of claim 11, wherein determining whether to split the existing partition comprises determining that the existing partition is approaching a storage capacity of the existing partition.

13. The non-transitory computer-readable storage medium of claim 11, wherein determining whether to split the existing partition comprises receiving a request to split the existing partition.

14. The non-transitory computer-readable storage medium of claim 11, wherein a hash function is utilized to allocate data to the variable sized partitions in the distributed hash table at a substantially equal rate.

15. The non-transitory computer-readable storage medium of claim 11, wherein the portion of the keyspace assigned to the new partition comprises substantially one-half of the keyspace allocated to the existing partition.

16. The non-transitory computer-readable storage medium of claim 11, wherein the size of the new partition in the distributed hash table is further based at least in part on a mathematical function.

17. The non-transitory computer-readable storage medium of claim 16, wherein the mathematical function comprises an exponential function.

18. The non-transitory computer-readable storage medium of claim 11, wherein the data stored on the existing partition reallocated to the new partition comprises substantially one-half of the total data allocated to the existing partition.

19. The non-transitory computer-readable storage medium of claim 11, wherein determining to split the existing partition in the distributed hash table is based at least in part on predicating, using a mathematical formula, that the existing partition is reaching a threshold capacity.

20. The non-transitory computer-readable storage medium of claim 11, wherein the size of the new partition is further based at least in part on a scaled size of the existing partition.

* * * * *